A. JONES.
Harrow Teeth.
No. 77,737.
Patented May 12, 1868.
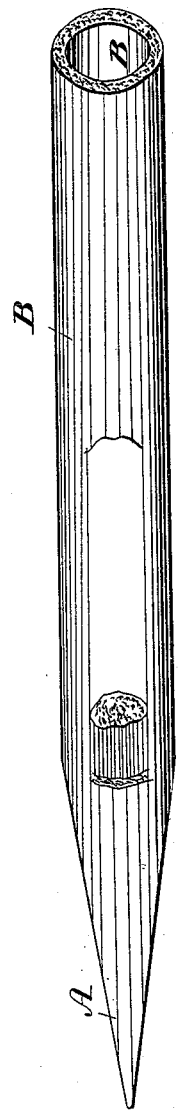

United States Patent Office.

ALVARADO JONES, OF WESTFORD, WISCONSIN, ASSIGNOR TO HIMSELF AND A. A. SAGE, OF THE SAME PLACE.

Letters Patent No. 77,737, dated May 12, 1868.

IMPROVEMENT IN HARROW-TEETH.

The Schedule referred to in these Letters Patent and making part of the same.

TO ALL WHOM IT MAY CONCERN:

Be it known that I, ALVARADO JONES, of the town of Westford, in the county of Dodge, and State of Wisconsin, have invented a new and improved Harrow-Tooth; and I do hereby declare that the following is a full and exact description thereof, and the mode of constructing the same, reference being had to the accompanying drawings, and to letters of reference marked thereon.

The nature of my invention consists in constructing harrow-teeth by inserting the necessary amount of steel in the end of a hollow rod of iron, (such as is used for gas-pipe will answer,) and welding the same in and to the iron, and drawing said piece of steel to a point, as shown in the annexed drawing at A, leaving the other part of the tooth hollow, as shown at B in said drawing, thus producing a steel-pointed hollow tooth, of greater strength according to its heft than any heretofore manufactured or used.

Letter A represents the solid steel point, and B represents the hollow part or body of the tooth.

What I claim as my invention, and desire to secure by Letters Patent, is—

The hollow body B, in combination with the solid steel point A, in the construction of a harrow-tooth, substantially as and for the purposes set forth, as a new manufacture.

Dated this 3d day of August, A. D. 1867.

ALVARADO JONES.

Witnesses:
PERRY HODGE,
ABIAL STARK.